United States Patent
Dallas et al.

(10) Patent No.: US 8,619,555 B2
(45) Date of Patent: Dec. 31, 2013

(54) METHOD AND SYSTEM FOR PATH SELECTION IN A NETWORK

(75) Inventors: William D. Dallas, Merrimack, NH (US); Chris Busick, Shrewsbury, MA (US)

(73) Assignee: Netapp, Inc., Sunnyvale, CA (US)

( * ) Notice: Subject to any disclaimer, the term of this patent is extended or adjusted under 35 U.S.C. 154(b) by 496 days.

(21) Appl. No.: 12/948,498

(22) Filed: Nov. 17, 2010

(65) Prior Publication Data

US 2012/0124414 A1 May 17, 2012

(51) Int. Cl.
| | |
|---|---|
| G01R 31/08 | (2006.01) |
| G08C 15/00 | (2006.01) |
| H04L 1/00 | (2006.01) |
| G06F 11/00 | (2006.01) |
| G06F 15/173 | (2006.01) |
| G06F 3/00 | (2006.01) |

(52) U.S. Cl.
USPC ........... 370/228; 370/238; 370/244; 370/248; 370/395.32; 709/239; 709/241; 710/29; 710/38; 714/2; 714/48

(58) Field of Classification Search
USPC .................. 709/239, 241; 370/238, 244, 248, 370/395.32; 710/29, 38; 714/2, 48
See application file for complete search history.

(56) References Cited

U.S. PATENT DOCUMENTS

| | | | | |
|---|---|---|---|---|
| 7,093,155 | B2* | 8/2006 | Aoki | 714/4.11 |
| 7,275,103 | B1* | 9/2007 | Thrasher et al. | 709/224 |
| 7,603,507 | B2* | 10/2009 | Yagi et al. | 710/316 |
| 7,636,801 | B1* | 12/2009 | Kekre et al. | 710/31 |
| 7,668,981 | B1* | 2/2010 | Nagineni et al. | 710/38 |
| 7,778,157 | B1* | 8/2010 | Tawri et al. | 370/216 |
| 7,779,308 | B2* | 8/2010 | Brown et al. | 714/48 |
| 7,805,566 | B2* | 9/2010 | Abouelwafa et al. | 711/114 |
| 2003/0005119 | A1* | 1/2003 | Mercier et al. | 709/225 |
| 2008/0126615 | A1* | 5/2008 | Sinclair et al. | 710/38 |
| 2008/0147878 | A1* | 6/2008 | Kottomtharayil et al. | 709/235 |
| 2009/0271541 | A1* | 10/2009 | Aoki et al. | 710/38 |
| 2010/0161852 | A1* | 6/2010 | Veni et al. | 710/38 |

* cited by examiner

Primary Examiner — Alpus H Hsu
Assistant Examiner — Dharmesh Patel
(74) Attorney, Agent, or Firm — Klein, O'Neill & Singh, LLP (57) ABSTRACT

Method and system for handling error events on a current path for processing an I/O request for reading information from and writing information to a storage space is provided. A system is able to communicate with the storage space via more than one path. If the current path reports an error event, then an alternate path quality is determined to ascertain whether the alternate path will generate an error similar to the current path. The alternate path quality is determined based on a plurality of factors which are assigned certain weights. The weights are determined based on a likely contribution of each factor to a repetition of the error reported by the current path. If the alternate path quality is equal to or exceeds a programmable threshold value, then the alternate path is selected.

38 Claims, 8 Drawing Sheets

METHOD AND SYSTEM FOR PATH SELECTION IN A NETWORK

TECHNICAL FIELD

The present disclosure relates to storage systems and networks.

BACKGROUND

Various forms of storage systems are used today. These forms include network attached storage (NAS) systems, storage area networks (SANs), and others. SANs typically use a network of storage devices for storing information. The storage devices appear as local storage to computing systems that operate within the SAN.

Typically, a SAN uses a plurality of components for providing access to storage. For example, a plurality of fabric switches, a plurality of adapters and other components may be used for processing input/output (I/O) requests. An I/O request is typically generated by one or more computing systems to read and write information to and from a storage device. Some of these components may generate errors while I/O requests are being processed. Continuous efforts are being made to handle errors and failure events for efficiently processing I/O requests.

SUMMARY

In one embodiment, a method and system for handling error events on a current path used by a storage system for processing an input/output (I/O) request for reading information from and writing information to a storage array is provided. The storage system is able to communicate with the storage array via more than one path.

If the current path reports an error event, then an alternate path quality is determined to ascertain whether the alternate path is likely to generate an error similar to the current path. The alternate path quality is determined based on a plurality of factors which are assigned certain weights. The weights are based on a likely contribution of each factor to a repetition of the error reported by the current path. If the alternate path quality is equal to or exceeds a programmable threshold value, then the alternate path is selected.

If the alternate path quality is less than the threshold value, then other paths, if available, are evaluated. Once all the paths are analyzed and if none of their path quality is equal to or exceed the threshold value, then the path with the highest quality is selected.

In another embodiment, a machine implemented method for transmitting an input/output ("I/O") request between a storage system and a storage array is provided. The method includes assigning a weight to a plurality of factors for determining a path quality of a plurality of paths between the storage system and the storage array. A value of each weight is based on a likely contribution of each factor to a repetition of an error reported by a current path used for transmitting the I/O request. The path quality provides a likelihood of reporting an error on an alternate path similar to the error reported on the current path.

The method further includes assigning a threshold value for a path quality of each alternate path available to transmit the I/O request, when the current path reports an error, where the threshold value is a minimum path quality for selecting a path for transmitting the I/O request without having to evaluate other available alternate paths; and determining if an alternate path is available for transmitting the I/O request, after an error is reported by the current path.

A path quality of the alternate path is determined based on the weights assigned to the plurality of factors; and the alternate path is selected if the path quality of the alternate path is equal to or exceeds the threshold value.

In yet another embodiment, a machine implemented method is provided. The method includes generating a data structure comprising a weight assigned to a factor for determining a path quality of a path between a system and a storage space; detecting an error associated with transmitting an input/output (I/O) request through a first path; and accessing the data structure to determine an alternate path for transmitting the I/O request based on the weight assigned to the factor.

In another embodiment, a machine implemented method for transmitting an input/output ("I/O") request between a storage system and a storage array is provided. The method includes determining if an alternate path is available for transmitting the I/O request when an error is reported by a current path used for transmitting the I/O request; determining a path quality of the alternate path, where the path quality is based on a weight assigned to a plurality of factors associated with a plurality of components between the storage system and the storage array and a value of each weight is based on a likely contribution of each factor to a repetition of the error reported by the current path.

The method further includes selecting the alternate path if the path quality is equal to or exceeds a threshold value, where the threshold value is a minimum path quality used for selecting the alternate path for transmitting the I/O request without having to evaluate other available alternate paths; determining a path quality of other available alternate paths, if the path quality of the alternate path is less than the threshold value; and selecting an alternate path from among the other alternate paths with a highest path quality.

In yet another embodiment, a system is provided. The system includes a storage system and a storage array using a current path having a plurality of components for processing an input/output ("I/O") request; and a processor for the storage system executing instructions for determining if an alternate path is available for transmitting the I/O request, after an error is reported by the current path; and determining a path quality of the alternate path.

The path quality is based on a weight assigned to a plurality of factors associated with the plurality of components between the storage system and the storage array and a value of each weight is based on a likely contribution of each factor to a repetition of the error reported by the current path; and the alternate path is selected if the path quality is equal to or exceeds a threshold value, which is a minimum path quality for selecting the alternate path for transmitting the I/O request without having to evaluate other available paths.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As a preliminary note, the terms "component", "module", "system," and the like as used in this disclosure are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

In one embodiment, a method and system for handling error events on a current path used by a storage system for processing an input/output (I/O) request for reading information from and writing information to a storage array is provided. The storage system is able to communicate with the storage array via more than one path. If the current path reports an error event, then an alternate path quality is determined to ascertain whether the alternate path will generate an error similar to the current path. The alternate path quality is determined based on a plurality of factors which are assigned certain weights. The weights are based on a likely contribution of each factor to a repetition of the error reported by the current path. If the alternate path quality is equal to or exceeds a programmable threshold value, then the alternate path is selected.

If the alternate path quality is less than the threshold value, then other paths, if available, are evaluated. Once all the paths are analyzed and if none of their path quality is equal to or exceed the threshold value, then the path with the highest quality is selected.

Figure 1A:
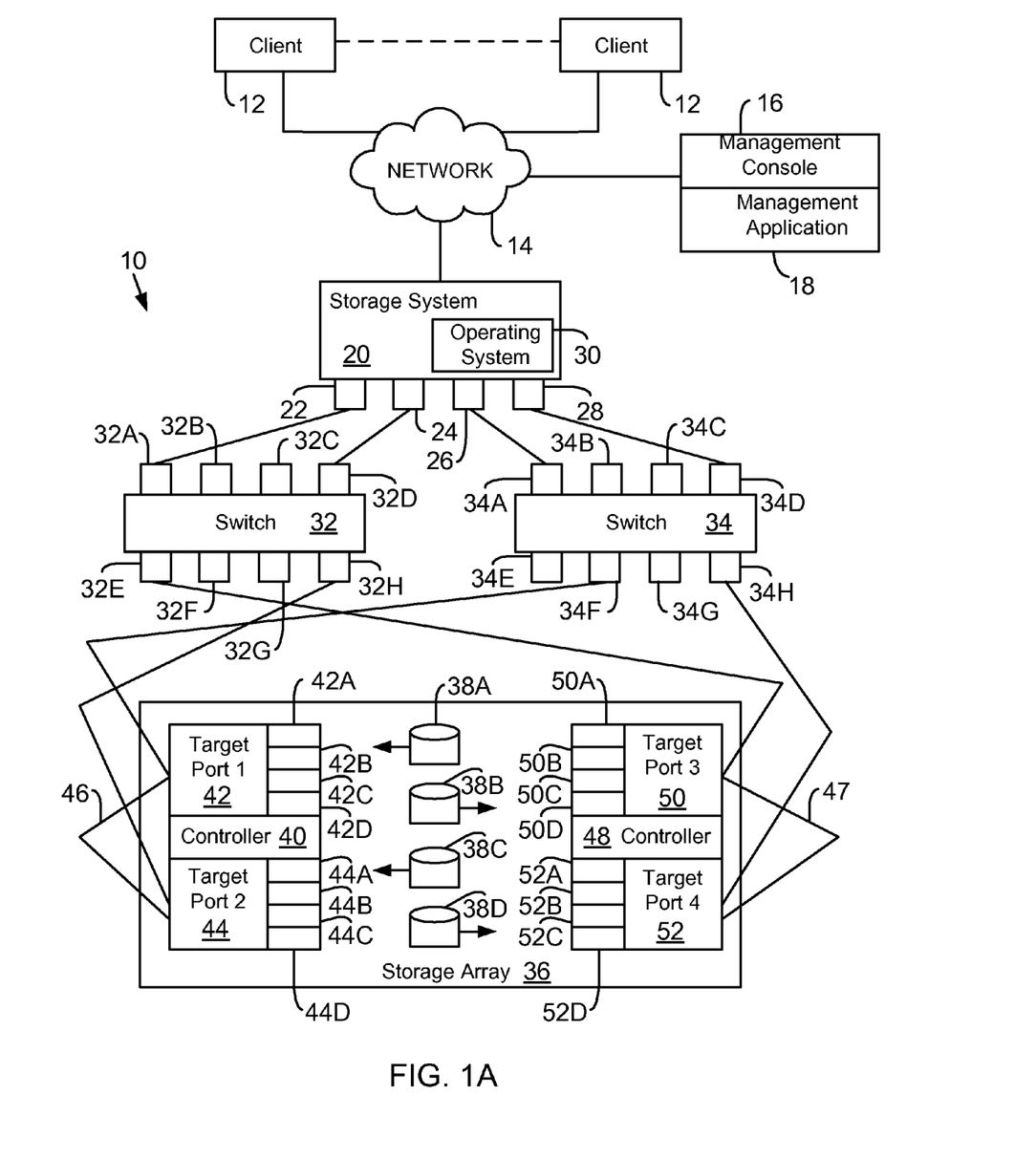
FIG. 1A shows a block diagram of a system using the embodiments disclosed herein.

System:

FIG. 1A shows an example of a system 10 for implementing the various embodiments of the present disclosure, as described below. System 10 includes at least one storage system 20, executing an operating system 30 for reading and writing information, to and from a storage array 36. Storage system 20 may access storage via a plurality of paths, for example, via a switch 32 and/or switch 34, as described below. It is noteworthy that the adaptive embodiments disclosed herein are not limited to any particular number of switches or any other components.

Storage system 20 may use one or more adapters 22, 24, 26 and 28 to access storage array 36 via switch 32 and 34. Adapters 22, 24, 26 and 28 are configured to initiate an I/O operation to read information from storage array 36 or write information to storage array 36. Adapter 22, 24, 26 and 28 may include logic and circuitry for sending and receiving information in compliance with certain standard protocols, for example, Fibre Channel, Fibre Channel over Ethernet and others.

Storage array 36 includes a plurality of mass storage devices 38A-38D for storing information and may be configured to operate in different configurations, for example, RAID configurations. The mass storage devices 38A-38D may be, for example, conventional magnetic disks, optical disks such as CD-ROM or DVD based storage, magneto-optical (MO) storage, flash memory storage device or any other type of non-volatile storage devices suitable for storing data. The examples disclosed herein may reference a storage device as a "disk" but the adaptive embodiments disclosed herein are not limited to disks or any particular type of storage media/device.

The storage devices 38A-38D are accessible through one or more target ports 42 (also shown as target port 1), 44 (also shown as target port 2), 50 (also shown as target port 3) and 52 (also shown as target port 4). The term target as used herein means a storage device, a portion of a storage device or any module/component used for accessing a storage device or a portion thereof. The term port as used herein means a module that includes logic and circuitry for communicating with other components. Typically, a port is identified by a unique identifier, for example, by using a world wide port number (WWPN). Ports may be included in adapters, switches or any other components. For example, the target ports 42, 44, 50 and 52 of FIG. 1A may be a part of adapters (not shown) in storage array 36 that are used for communicating with switches 32 and 34 for processing I/O requests or for any other reason.

The target ports 42, 44, 50 and 52 may be a part of a target port group, for example, 46 and 47. Each target port group is uniquely identified. In the example of FIG. 1A, target port group 46 includes target port 42 and target port 44. Target port group 47 includes target port 50 and target port 52.

Target port groups may include a controller for managing target ports and presenting storage space (may also be referred to as storage object) as logical space or logical units. The term logical space or unit as used herein means an externally addressable storage unit that can be used to store information. A logical unit may be identified by a unique logical unit number (LUN).

Referring back to FIG. 1A, target port group 46 may include a controller 40 that manages target ports 42 and 44. Controller 40 also presents physical storage from storage devices 38A-38D as logical units 42A-42D via target port 42 and logical units 44A-44D via target port 44. Similar to target group 46, target group 47 may also include a controller 48 that controls target ports 50 and 52. Controller 48 presents logical units 50A-50D via target port 50 and logical units 52A-52D via target port 52.

Switch 32 and 34 include a plurality of ports that operationally couple storage system 20 with storage array 36 for sending and receiving I/O requests. For example, switch 32 may include a plurality of ports 32A-32H. Port 32A may be operationally coupled to adapter 22, while port 32D may be operationally coupled to adapter 24. Port 32E may be operationally coupled to target port 50 and port 32H may be operationally coupled to target port 44. Ports 32A-32H include logic and circuitry to handle information (for example, frames and packets) complying with certain standard protocols, for example, Fibre Channel, Fibre Channel over Ethernet and others.

Switch 34 includes a plurality of ports 34A-34H. Port 34A may be operationally coupled to adapter 26 and port 34D is operationally coupled to adapter 28. Port 34F may be operationally coupled to target port 42, while port 34H may be coupled to target port 52. Ports 34A-34H may also include logic and circuitry to handle information (for example, frames and packets) complying with certain standard protocols, for example, Fibre Channel, Fibre Channel over Ethernet and others.

As shown in FIG. 1A, storage system 20 may access storage array 36 through different paths using switch 32 and 34. When an I/O request is being processed, one or more component (for example, a switch, a port, an adapter or any other component) may report an error. Different error types may be reported, for example, a network link may be down, an adapter may be over utilized and hence may report an error, and since different protocol layers are used for communication, there may be protocol related errors. The embodiments disclosed herein are not limited to any particular error types.

In conventional systems, when an error is reported on a current path that is processing an I/O request, the I/O request is often retried using the same path that includes one or more components that may have generated the original error in the first place. Retrying the I/O request using the same path may not be successful, which delays I/O processing and wastes computing resources. The embodiments described below in detail, efficiently select an alternate path, if one is available.

The storage system 20 may be operationally coupled to a plurality of clients 12 through a network 14. Each client 12 may be, for example, a conventional personal computer (PC), workstation, or the like. The network 14 may be, for example, a local area network (LAN), a wide area network (WAN), a storage area network (SAN), or any other type of network or a combination of networks. Storage system 20 receives and responds to various read and write requests from clients 12, directed to data stored in or to be stored at storage array 36.

Also connected to the network 14 is a management console 16 that may store and execute a management application 18 (may also be referred to as a storage management application 18). The management console 16 may be, for example, a conventional PC, a workstation, or the like.

The processor executable, management application 18 may be used by a storage network administrator to manage a pool of storage devices and various components of system 10, for example, switch 32, switch 34, adapters 22, 24, 26 and 28. The management application 18 includes a graphical user interface (GUI) module to generate a GUI (e.g., for use by an administrator. In another embodiment, the management application 18 may provide a command line interface (CLI) for use by an administrator for managing and configuring various components of system 10.

Management application 18 is configured to collect various parameters and data from the operating system 30 and different components of system 10. To obtain such information, communication between the management application 18, clients 12 and storage system 20 may be accomplished using any of the various conventional communication protocols and/or application programming interfaces (APIs), the details of which are not germane to the technique being introduced here. This communication can be done through the network 14 or it can be via a direct link (not shown) between the management console 16 and storage system 20.

Figure 1B:
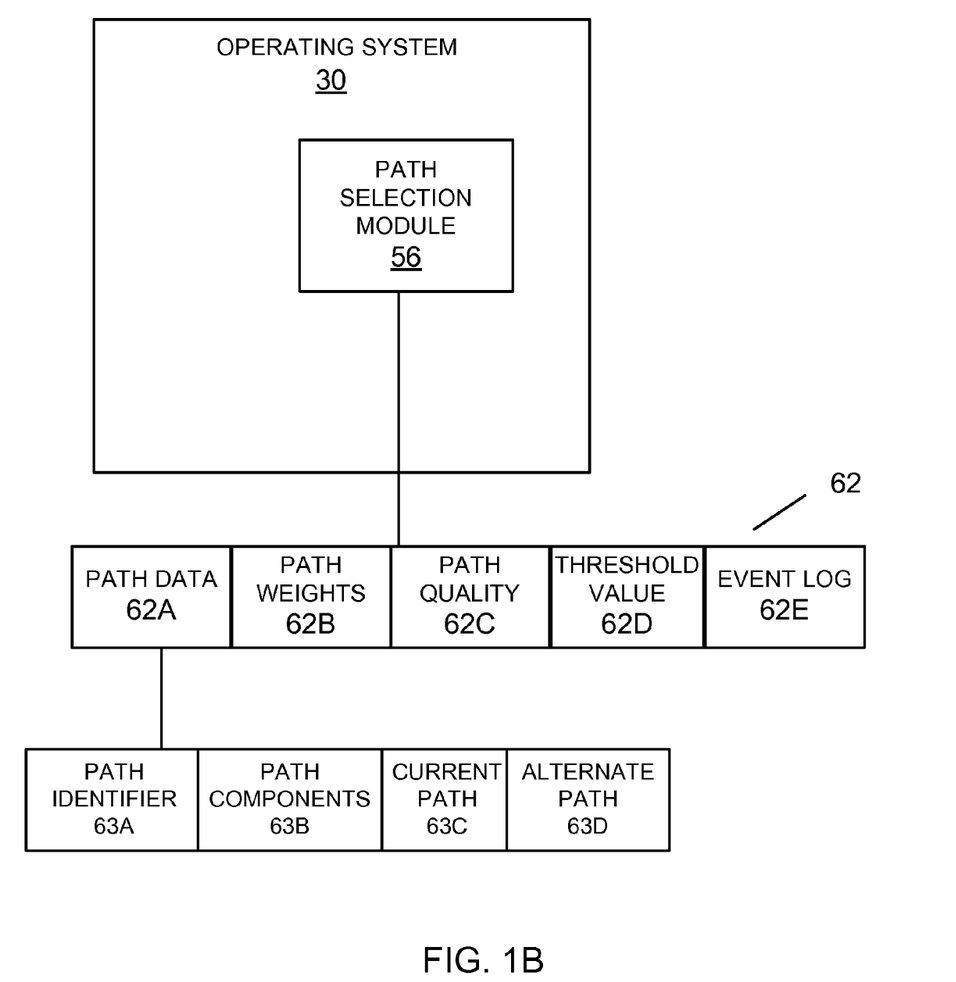
FIG. 1B shows a path selection module, according to one embodiment of the present disclosure.

Path Selection Module 56:

FIG. 1B shows a block diagram of a processor executable, path selection module 56. In one embodiment, path selection module 56 may be integrated with operating system 30 or interfaces with operating system 30. It is noteworthy that the embodiments disclosed herein are not limited to the path selection module 30 being integrated with the operating system 30 and may be located or executed at another location, for example, path selection module 56 may be integrated with management application 18 and executed by management console 16.

Path selection module 56 is used to select an alternate path, if available, when a current path processing an I/O request reports an error. As described below in more detail, the alternate path is selected based on a path quality which reduces the likelihood of repeating the same error reported by the current path.

For selecting the alternate path, path selection module 56 generates and maintains a path selection data structure 62 (may also be referred to as data structure 62), according to one embodiment. Data structure 62 may include various sub-structures, for example, path data 62A, path selection weights 62B (shown as Path Weights 62B), path quality 62C, threshold values 62D and an event log 62E that are all described in detail below.

Path data 62A includes information regarding different paths between storage system 20 and storage array 36 and uses various sub-data structures 63A-63D. For example, a first path may be from adapter 22 to port 32A and then from port 32E to target port 50. A second path may be from adapter 24 to port 32D and then from port 32H to target port 44. A third path may be from adapter 26 to port 34A and then from port 34F to target port 42. A fourth path may be from adapter 28 to port 34D and then from port 34H to target port 52.

The various paths may be identified by a path identifier 63A. Since different paths have different components, the various path components may also be identified by sub-data structure 63B. An indicator 63C may be used to indicate that a path is a current path for transmitting an I/O request, while an alternate path to a current path maybe identified by an indicator 63D. The sub-data structures 63A-63D allow path selection module 56 to identify one or more alternate paths quickly.

The various paths identified by 63A and the components identified by 63B may be discovered by different mechanisms defined by standard protocols, operating systems and other mechanisms. In one embodiment, the various paths and components may be discovered by sending out initialization packets to various components, for example, switch 32 and 34 and target ports 42, 44, 50 and 52. The packets may be sent by different components of storage system 20, for example, adapters 22, 24, 26 and 28. The different components, for example, switch 32 and 34 and target ports 42, 44, 50 and 52 respond to the initialization packets. The response may be reported to operating system 30 for storing path data 62A. The path data 62A is then used by path selection module 56 for selecting an alternate path, as described below in more detail.

The type and format of the initialization packets depends on the protocol used for communication in system 10. For example, if Fibre Channel, Fibre Channel over Ethernet protocol, InfiniBand or any other protocol type is being used for communication, then the initialization packet complying with the protocol is sent to all communicating ports within system 10. The embodiments herein are not limited to any particular protocol, operating system or any packet format.

Path selection weights 62B may be designated as W1-Wn. The weights may be designated by an administrator using management console 16 or any other computing system within system 10.

Weights W1-Wn are assigned to each of a plurality of factors, F1-Fn for determining the quality of a path (referred to herein as "path quality") used for processing an I/O request. The value of each weight, W1-Wn, is based on the importance of a factor and how the factor impacts overall path quality. For example, if F1 is the most important factor, then W1 has the highest value and if Fn is the least important factor then Wn has the least value.

The importance of each factor may vary for different operating environments and hence are configurable. For example, factor F1 may be the most important factor for an operating environment of a high traffic data center. Another factor, F2 may be the most important factor in a smaller SAN. The embodiments disclosed herein are not limited to assigning any specific importance to a factor for determining path quality. Examples of some of factors F1-Fn are provided below in more detail.

The term path quality as used herein means a path's ability to transmit an I/O request from a source to a destination with a less likelihood of replicating an error that may have occurred in another path. For example, if a first path (may also be referred to as the current or original path) reports any error event and an alternate path is available to send the I/O request, then the alternate path's quality is an estimate that provides the likelihood of repeating the same or different error than the first path. A higher path quality denotes a less likelihood of reporting the same error and a low path quality denotes a high likelihood of reporting a similar error.

In one embodiment, path quality may be ascertained by the following equation:

$$(W1*F1+W2*F2+W3*F3 \ldots Wn*Fn) \quad (I)$$

In Equation (I), W1 is the weight assigned to Factor F1, W2 is the weight assigned to factor F2 and Wn is assigned to Fn.

Each factor, F1-Fn, may have a value of 1 or 0. A value of 1 denotes that the factor is true and hence impacts path quality. Hence, when a factor is true, its associated weight is considered in determining the overall path quality.

When a factor value is 0, it denotes that the factor is false and does not impact path quality. In such a case, the weight associated with the factor is not considered in determining path quality.

As an example, the value of weights W1-Wn may be based on a set of hierarchical numbers ranging between $2^n$ to 1. A weight Wx may be determined by:

$$Wx=(2^{(n-x)}) \quad (II)$$

For example, if x=1 and n=5 i.e. there are 5 factors, then W1 for F1 may be determined by $=(2^{(5-1)})$. In this example, W1 is equal to 16. Using the same relational ship, when n=5 and x=5, W5=1.

It is noteworthy that the embodiments disclosed herein are not limited to determining weights using equation II. Weights may be assigned using other techniques.

The foregoing approach has advantages because as networks evolve and new factors emanate, one can add a new factor to the path weight 62B without having to add new logic to handle the new factor.

The following now provides an example of some of the factors, F1-Fn, that are assigned weights W1-Wn to ascertain path quality using Equation I:

F1 may be a factor that is based on a number of errors that may have been received on an alternate path within a certain duration. This may be referred to as an error rate. In one embodiment, a weight of W1 is assigned to F1 based on Equation II, described above.

F2 may be a factor that is based on whether the alternate path uses a same target port group (for example, 46 or 47) as a current path for processing the I/O request. In one embodiment, a weight of W2 is assigned to F2 based on Equation II described above.

F3 may be a factor that is based on whether the alternate path uses the same target port (for example, 42, 44, 50 and 52, FIG. 1A) as the current path for processing the I/O request. In one embodiment, a weight of W3 is assigned to F3 based on Equation II described above.

Factor F4 may be based on whether the alternate path uses a same switch (for example, 32 or 34) as the current path for processing the I/O request. In one embodiment, a weight of W4 is assigned to F4 based on Equation II described above.

Factor F5 may be based on whether the alternate path uses a same adapter as the current path for processing the I/O request. In one embodiment, a weight of W5 is assigned to F5 based on Equation II described above.

In one embodiment, path quality determined by Equation I, is stored as path quality data structure 62C (also referred to as path quality 62C). The path quality 62C is stored for each path that may be used by storage system 20 to transmit an I/O request. For example, as described above with respect to path data 62A, path quality values for each path 1-4 may be stored in path quality data structure 62C. Path selection module 56 uses the path quality data structure 62C to select an alternate path as described below in more detail.

Before an alternate path is selected to transmit an I/O request, its path quality is compared to a threshold value. The threshold values are programmable and stored as 62D. The threshold values may be set by an administrator using management application 18. The use of threshold value 62D is described below in more detail with respect to FIGS. 1C and 1D.

Event log 62E is maintained to track different error events that occur while an I/O request is being processed. Event log 62E may include a plurality of entries. For example, event log 62E may store the identity of a component that generates an error during I/O transmission, for example, a switch port of switch 32. Event log 62E may also store a code indicating the type of error event, when the event occurred and historical error related data regarding the component.

Event log 62E may be used by an administrator using management application 18 to evaluate error conditions and assign importance to factors F1-Fn. For example, by evaluating event log 62E, an administrator may conclude that F1, a factor based on error rate described above is not the most important factor and instead F4, a factor based on using the same switch is the most important factor in selecting the alternate path.

In one embodiment, although data structure 62 is shown to have multiple components/segments, for example, 62A-62E, they may be included in an integrated single data structure. In a distributed architecture, different components of data structure 62 may be stored in different memory locations and may be accessible to operating system 30 and path selection module 56 via network 14. The memory location may be local or remote to the operating system 30.

Figure 1C:
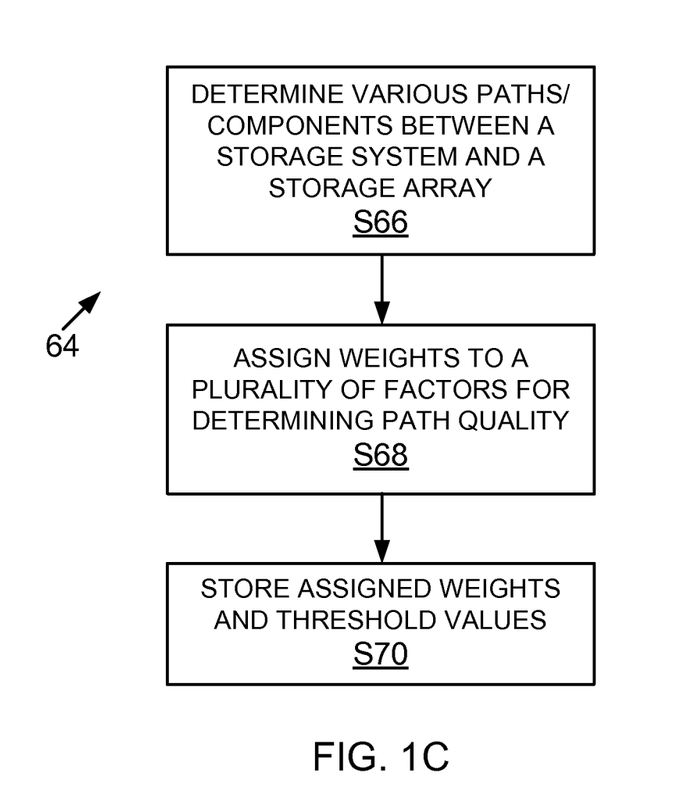
FIGS. 1C-1D show process flow diagrams, according to one embodiment.

Process Flow:

FIG. 1C shows a process 64 for configuring system 10 for alternate path selection, according to one embodiment. The process 64 begins in block S66, when information regarding various components and different paths between storage system 20 and storage array 36 for transmitting I/O requests is determined. For example, a first path may be from adapter 22 to port 32A and then from port 32E to target port 50. A second path may be from adapter 24 to port 32D and then from port 32H to target port 44. A third path may be from adapter 26 to port 34A and then from port 34F to target port 42. A fourth path may be from adapter 28 to port 34D and then from port 34H to target port 52. It is noteworthy that the foregoing paths are simply shown as an example and the adaptive embodiments are not limited to any particular path or any number of paths.

The path information may be stored by storage operating system 30 and/or management application 18 as path data 62A with sub-data structures 63A-63D, as described above with respect to FIG. 1B. In one embodiment, path information may be collected when system 10 components are initialized. Operating system 30 and/or management application 18 may collect the path information by sending initialization packets to the various components, for example, adapters, switches and target ports. In another embodiment, the components send connection information upon being powered up to operating system 30 and/or management application 18.

Once the path information is gathered, in block S68, a plurality of weights, W1-Wn for a plurality of factors F1-Fn, are assigned certain values for determining path quality of a path that can be used for processing an I/O request. As described above, factors, F1-Fn, are based on how they impact transmission of an I/O request between storage system 20 and storage array 36 and their possible contribution to a repetition of an error reported by a current path. The number and nature of factors F1-Fn may vary from one operating environment to another. An administrator using management application 18 may add new factors and rearrange previous factors.

In block S70, threshold values are assigned. A threshold value is a value that may be used to select an alternate path without having to check path quality of all available alternate paths. The weights and threshold values are then stored in block S70. In one embodiment, the weights may be stored as path weights 62B and threshold values are stored as 62D, as described above with respect to FIG. 1B.

Figure 1D:
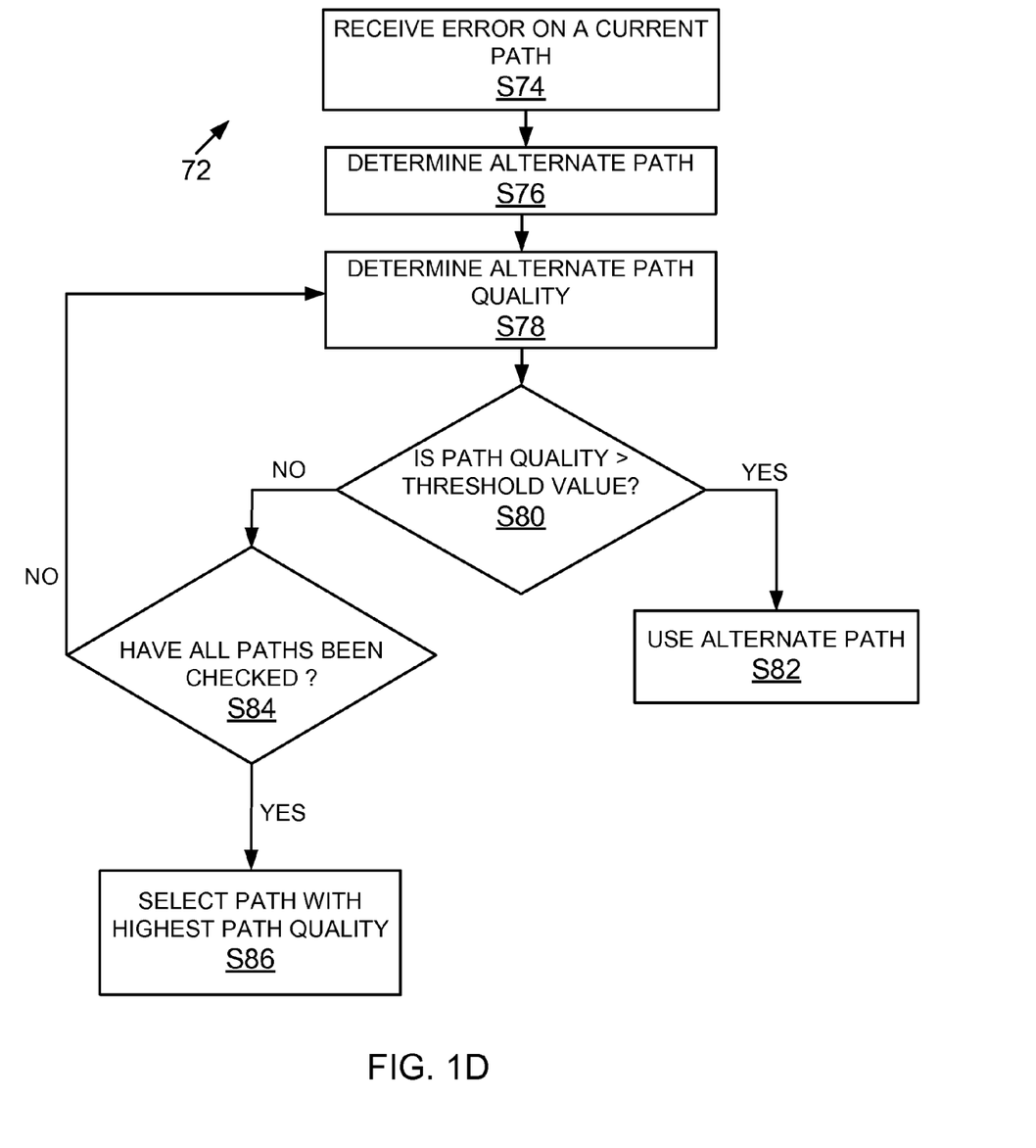

The overall weighting scheme, examples of different factor types and how they are used to select an alternate path when a current path reports an error event is now described below in more detail with respect to FIG. 1D that shows a process 72 for selecting an alternate path for transmitting an I/O request, according to one embodiment.

The process 72 begins in block S74, when an error is received on a current communication path that is processing an I/O request. The error may be received by the operating system 30 that may be responding to an I/O request and/or management application 18. The error event is stored as part of event log 62E. The event log 62E identifies the type of error and the time the error occurred.

In block S76, the process determines if an alternate path is available to transmit the I/O request. An alternate path may be ascertained by path selection module 56 by evaluating path data 62A in general and using data structure 63D that identifies an alternate path, in particular. Referring to the example of FIG. 1A, assume that the first path using adapter 22, port 32A, port 32E and target port 50 is a current path for accessing storage array 36 as identified by 63C (FIG. 1B). There may be three other alternate paths to access storage array 36. For example, alternate path 1 may use adapter 24, port 32D, port 32H and target port 44. Alternate path 2 may use adapter 26, port 34A, port 34F and target port 42. Alternate path 3 may use adapter 28, port 34D, port 34H and target port 52. Any one of the alternate path may be chosen for further evaluation.

In block S78, an alternate path quality (Pxq) for the alternate path is determined. As described above, the path quality is a measure for predicting the likelihood that an I/O request will be serviced promptly using an alternate path without the alternate path repeating an error similar to the error reported by current path. In one embodiment, as described above, the path quality may be ascertained by:

$$Pxq=(W1*F1+W2*F2+W3*F3 \ldots Wn*Fn)$$

As described above, W1 is the weight assigned to Factor F1, W2 is the weight assigned to factor F2 and Wn is assigned to Fn. Each factor, F1-Fn, may have a value of 1 or 0. A particular weight is used when a factor is true, for example, having a value of 1, otherwise, the weight for factor is ignored. When a weight is ignored, it lowers the overall path quality for an alternate path.

In one embodiment, as described above, the value of weights W1-Wn may be based on a set of hierarchical numbers ranging between $2^n$ to 1 for example, $Wx=(2^{(n-x)})$, where n is the total number of factors and x may range from 1 to n. The following provides an example of different factors F1-Fn having weights W1-Wn for determining alternate path quality, according to one embodiment.

F1 may be factor that is based on an error rate for the alternate path. Event log 62E is used to ascertain error rate information for the alternate path.

F1 may be assigned a weight of W1. If the alternate path quality is higher than the current path, then Factor F1 may be assigned a value of 0 and weight W1 is ignored. This results in lower path quality. If the alternate path error rate is lower than the error rate of the current path, then weight W1 is used to determine the path quality.

F2 may be a factor that is based on whether the alternate path uses the same target port group (for example, 46 or 47) as the current path. This information is available from path data 62A.

A weight of W2 is assigned to F2. If the same target port group is not used, then W2 is used to determine the alternate path quality. When the same target port group is used, then W2 is ignored resulting in lower overall path quality. W2 is ignored because if the same target port group is used in the alternate path, then there may be a higher chance of repeating the same error as the current path.

F3 may be a factor that is based on whether the alternate path uses the same target port (for example, 42, 44, 50 and 52, FIG. 1A). This information is available from path data 62A.

A weight of W3 is assigned to F3. If the same target port is not used in the current path, then W3 is used to determine path quality. When the same target port is used, then W3 is ignored resulting in lower overall path quality. W3 is ignored because if the same target port is used in the alternate path, then there may be a higher chance of repeating the same error as the current path.

Factor F4 may be based on whether a same switch (for example, 32 or 34) is used by the current path and the alternate path. This information is available from path data 62A.

A weight of W4 is assigned to F4. If a different switch is used by the alternate path, then W4 is used for determining alternate path quality. When the same switch is used, then W4 is ignored resulting in lower overall path quality. W4 is ignored because if the same switch is used in the alternate path, then there may be a higher chance of repeating the same error as the current path.

Factor F5 may be based on whether a same adapter is being used in the alternate path. This information is available from path data 62A.

A weight of W5 is assigned to F5. If the same adapter is not used in the current path, then W5 is used to determine path quality. When the same adapter is used, then W5 is ignored resulting in lower overall path quality. W5 is ignored because if the same adapter is used in the alternate path, then there may be a higher chance of repeating the same error as the current path.

It is noteworthy that the foregoing factors are only shown as examples. One can customize the number and type of factors based on network needs and preference.

Once the alternate path quality is determined, it is stored as 62C and then compared with a stored threshold value 62D in block S80. If the determined path quality is greater than the threshold value, then the process moves to block S82 where the I/O request from block S74 is processed via the alternate path.

If the alternate path quality is less than the threshold value, then in block S84, the process determines if all available alternate paths have been checked. If all the alternate paths have not been checked, then the process reverts back to block S78 when a next alternate path quality is determined and analyzed as described above.

If all the alternate paths have been checked, then the process moves to block S86, where the path with the highest quality is selected. The highest path quality is selected from stored path quality 62C.

In one embodiment, the alternate path is selected based on the likelihood of not repeating an error similar to the current path. This process saves time and resources because one does not have to retry transmitting an I/O request using the same current path that may generate the same error. Instead, one selects a path based on the analysis described above such that the I/O request is processed promptly by an alternate path that has less likelihood of repeating the same error.

It is noteworthy that although the examples described above are described with respect to a storage system communicating with a storage array, the embodiments disclosed herein are not limited to system 10 in general and storage arrays in particular. The data structures and the processes described above are applicable in any environment used for processing an I/O request and where multiple paths are used between communicating nodes. The path selection module 56 and data structure 62 may be maintained by any operating system, application or device.

The embodiments disclosed herein are especially useful in a cluster environment where various nodes are interconnected using multiple paths. A brief description of a cluster environment is now provided.

Figure 1E:
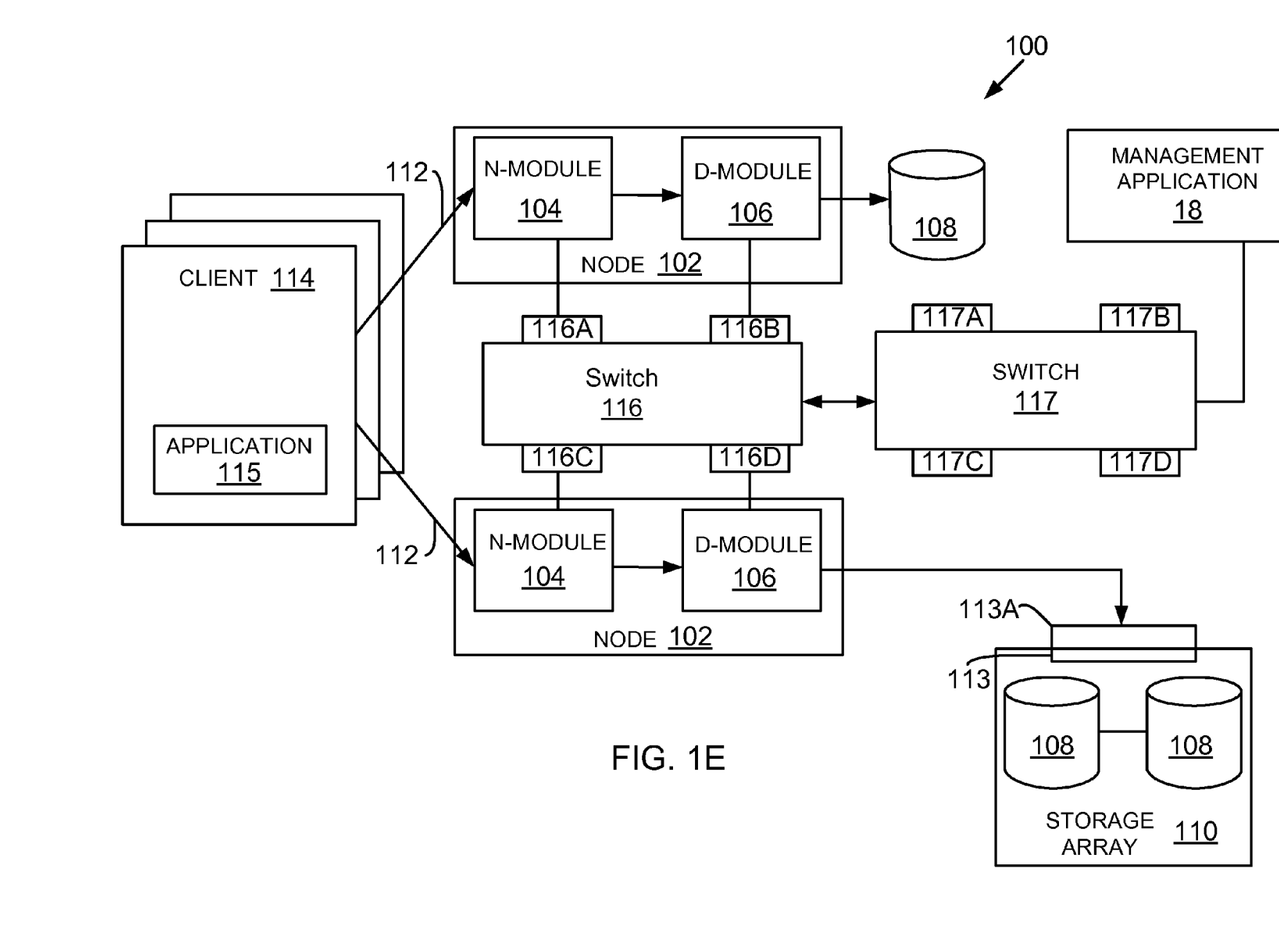
FIG. 1E shows a block diagram of a clustered system, according to one embodiment.

Clustered System:

FIG. 1E shows a cluster 100 having a plurality of interconnected nodes 102 configured to provide storage services related to information stored at a plurality storage devices 108. The process flow of FIGS. 1C and 1D described above are applicable to cluster 100 because cluster 100 uses a plurality of nodes 102 and a plurality of paths. If an error is reported on one path, then the processes of FIGS. 1C and 1D are used to select an optimum alternate path with a desirable path quality.

Figure 2:
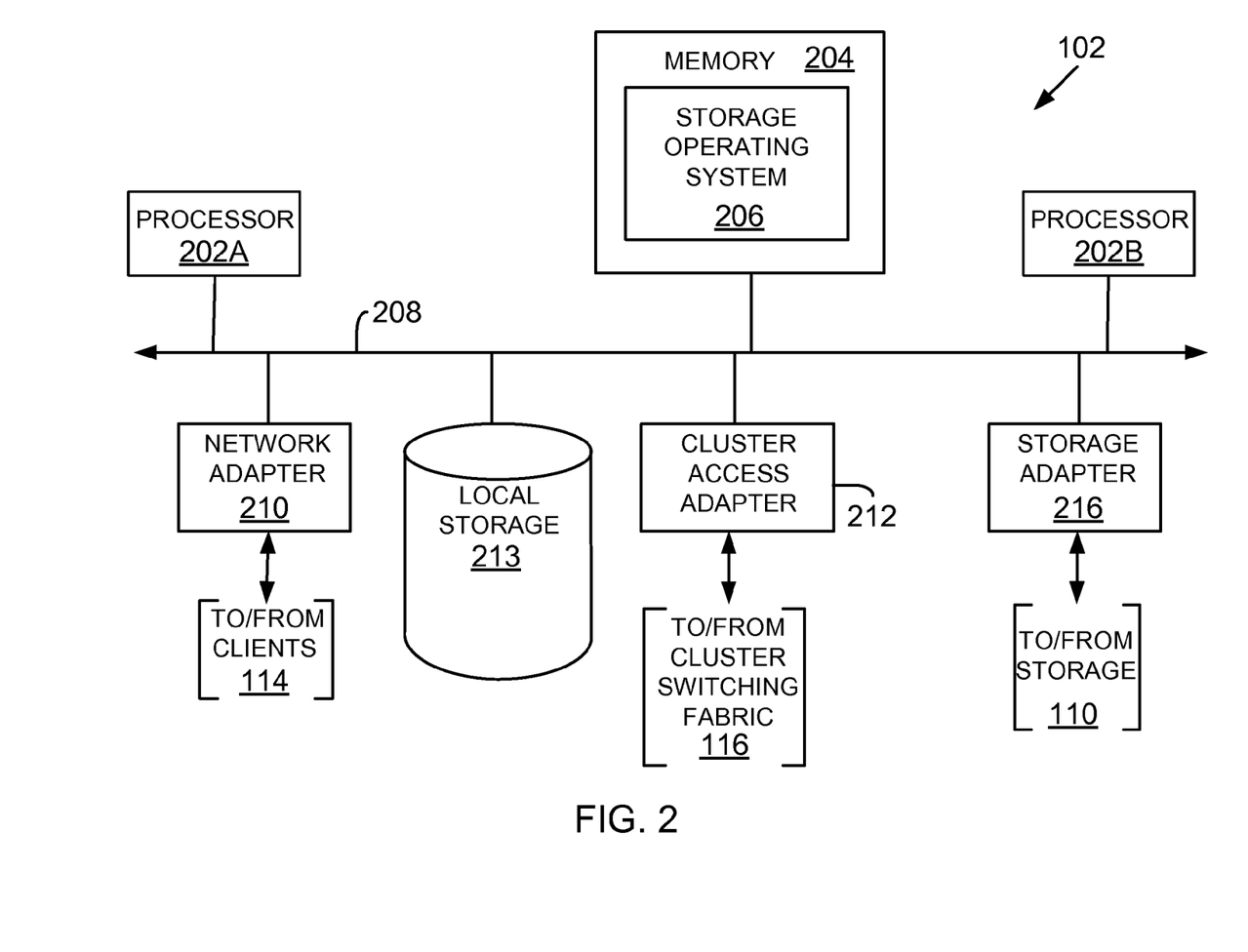
FIG. 2 shows a block diagram of a node, used according to one embodiment.

Nodes 102 comprise various functional components that cooperate to provide distributed storage system architecture of cluster 100. Each node 102 is generally organized as a network element (N-module 104) and a disk element (D-module 106). N-module 104 includes functionality that enables node 102 to connect to clients 114 over a computer network 112 and to management application 18, while each D-module 106 connects to one or more storage devices 108 (may generically be referred to as disks 108) or storage array 110 (similar to storage array 36) via an adapter 113 having at least one port 113A. Each N-module and D-module may also include their own adapters/logic for interfacing with each other and storage devices. FIG. 2 described below provide examples of such adapters/logic.

It should be noted that while there is shown an equal number of N and D-modules in the illustrative cluster 100, there may be differing numbers of N and/or D-modules in accordance with various embodiments of the present disclosure. For example, there may be a plurality of N-modules and/or D-modules interconnected in a cluster configuration 100 that does not reflect a one-to-one correspondence between the N and D-modules. As such, the description of a node 102 comprising one N-module and one D-module should be taken as illustrative only.

Nodes 102 may be interconnected by a cluster switching fabric 116 with ports 116A-116D, which, in the illustrative embodiment, may be embodied as a Gigabit Ethernet switch. Switch 116 may be similar to switch 32 of FIG. 1A. Switch 117 with ports 117A-117D may be used for alternate paths, similar to switch 34 of FIG. 1A, Clients 114 (similar to clients 12, FIG. 1A, may be configured to interact with a node 102 in accordance with a client/server model of information delivery. That is, each client 114 may request the services of the node 102, and the node 102 may return the results for the services requested by the client 114, by exchanging packets over the network 112.

For a SAN based configuration, client 114 may issue I/O requests using application 115 complying with block-based access protocols, such as the Small Computer Systems Interface ("SCSI") protocol encapsulated over TCP (iSCSI) and SCSI encapsulated over FCP. Alternatively, client 114 may issue packets using application 115 including file-based access protocols, such as the CIFS protocol or the NFS protocol, over TCP/IP when accessing information in the form of certain data containers. Data container in this context means a block, a file, a logical unit of data or any other information. CIFS means the Common Internet File System Protocol, an access protocol that client systems use to request file access services from storage systems over a network. NFS means Network File System, a protocol that allows a user to access storage over a network.

Storage System Node:

FIG. 2 is a block diagram of a node 102 used in cluster 100, described above with respect to FIG. 1E. Node 102 may include a plurality of processors (202A and 202B), a memory 204, a network adapter 210, a cluster access adapter 212, a storage adapter 216 and local storage 213 interconnected by a system bus 208. The local storage 213 comprises one or more storage devices, such as disks, utilized by the node to locally store configuration information.

The cluster access adapter 212 comprises a plurality of ports adapted to couple node 102 to other nodes of cluster 100. Cluster adapter 212 may be categorized as a component that is monitored and managed using the process flow diagrams described above with respect to FIGS. 1C and 1D.

In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 212 is utilized by the N/D-module for communicating with other N/D-modules in the cluster 100.

Each node 102 is illustratively embodied as a dual processor storage system executing a storage operating system 206 that preferably implements a high-level module, such as a file system, to logically organize the information as a hierarchical structure of named directories, files and special types of files called virtual disks (hereinafter generally "blocks") on storage devices 108. However, it will be apparent to those of ordinary skill in the art that the node 102 may alternatively comprise a single or more than two processor systems. Illustratively, one processor 202A executes the functions of the N-module 104 on the node, while the other processor 202B executes the functions of the D-module 106.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure disclosed herein.

The storage operating system 206 (similar to operating system 30, FIG. 1A), portions of which is typically resident in memory and executed by the processing elements, functionally organizes the node 102 by, inter alia, invoking storage operations in support of the storage service implemented by the node. An example of operating system 206 is the DATA ONTAP® (Registered trademark of NetApp, Inc.) operating system available from NetApp, Inc. However, it is expressly contemplated that any operating system, for example, Solaris®, HPUX® and others may use the inventive principles described herein. As such, where the term "ONTAP" or storage operating system is employed, it should be taken broadly to refer to any operating system or executable instructions that are otherwise adaptable to the teachings of this disclosure.

The network adapter 210 comprises a plurality of ports adapted to couple the node 102 to one or more clients 114 over point-to-point links, wide area networks, virtual private networks implemented over a public network (Internet) or a shared local area network. The network adapter 210 thus may comprise the mechanical, electrical and signaling circuitry needed to connect the node to the network. Illustratively, the computer network 112 may be embodied as an Ethernet network or a FC network. Each client 114 may communicate with the node over network 112 by exchanging discrete frames or packets of data according to pre-defined protocols, such as TCP/IP.

The storage adapter 216 cooperates with the storage operating system 206 executing on the node 102 to access information requested by the clients and management application 18. The information may be stored on any type of attached array of writable storage device media such as video tape, optical, DVD, magnetic tape, bubble memory, electronic random access memory, flash memory devices, micro-electro mechanical and any other similar media adapted to store information, including data and parity information. However, as illustratively described herein, the information is preferably stored on the disks 108 of storage array 110. The storage adapter 216 comprises a plurality of ports having input/output (I/O) interface circuitry that couples to the disks over an I/O interconnect arrangement, such as a conventional high-performance, FC link topology.

Figure 3:
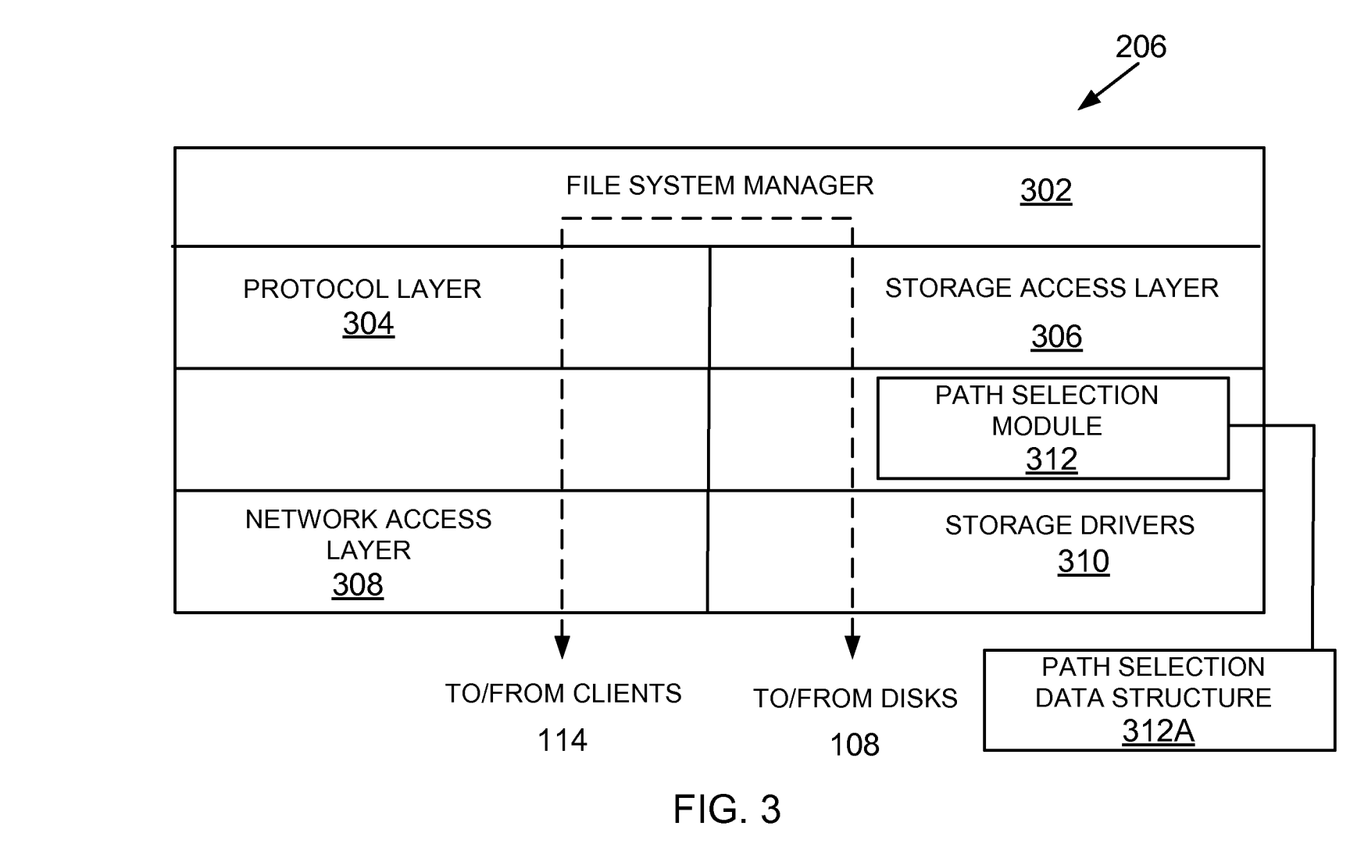
FIG. 3 shows an example of an operating system used according to one embodiment.

Operating System:

FIG. 3 illustrates a generic example of operating system 206 executed by node 102, according to one embodiment of the present disclosure. Operating system 206 includes or interfaces with a path selection module 312 (similar to path selection module 56 described above) and maintains data structures 312A which is similar to the data structure 62 described above in detail.

In one example, operating system 206 may include several modules, or "layers" executed by one or both of N-Module 104 and D-Module 106. These layers include a file system manager 302 that keeps track of a directory structure (hierarchy) of the data stored in storage devices and manages read/write operations, i.e., executes read/write operations on disks in response to client 114 requests.

Operating system 206 may also include a protocol layer 304 and an associated network access layer 308, to allow node 102 to communicate over a network with other systems, such as clients 114 and management application 18. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between clients 114 and mass storage devices 108 are illustrated schematically as a path, which illustrates the flow of data through operating system 206.

The operating system 206 may also include a storage access layer 306 and an associated storage driver layer 310 to allow D-module 106 to communicate with a storage device. The storage access layer 306 may implement a higher-level disk storage protocol, such as RAID (redundant array of inexpensive disks), while the storage driver layer 310 may implement a lower-level storage device access protocol, such as FC or SCSI.

In one embodiment, path selection module 312 may be located between layers 306 and 308. The embodiments disclosed herein are not limited to any particular location of path selection module 312.

It should be noted that the software "path" through the operating system layers described above needed to perform data storage access for a client request received at node 102 may alternatively be implemented in hardware. That is, in an alternate embodiment of the disclosure, the storage access request data path may be implemented as logic circuitry embodied within a field programmable gate array (FPGA) or an ASIC.

As used herein, the term "storage operating system" generally refers to the computer-executable code operable on a computer to perform a storage function that manages data access and may, in the case of a node 102, implement data access semantics of a general purpose operating system. The storage operating system can also be implemented as a microkernel, an application program operating over a general-purpose operating system, such as UNIX® or Windows XP®, or as a general-purpose operating system with configurable functionality.

In addition, it will be understood to those skilled in the art that the processes and systems described herein may apply to any type of special-purpose (e.g., file server, filer or storage serving appliance) or a general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or a host computer. The term "storage system" should therefore be taken broadly to include such arrangements in addition to any subsystems configured to perform a storage function and associated with other equipment or systems.

Figure 4:
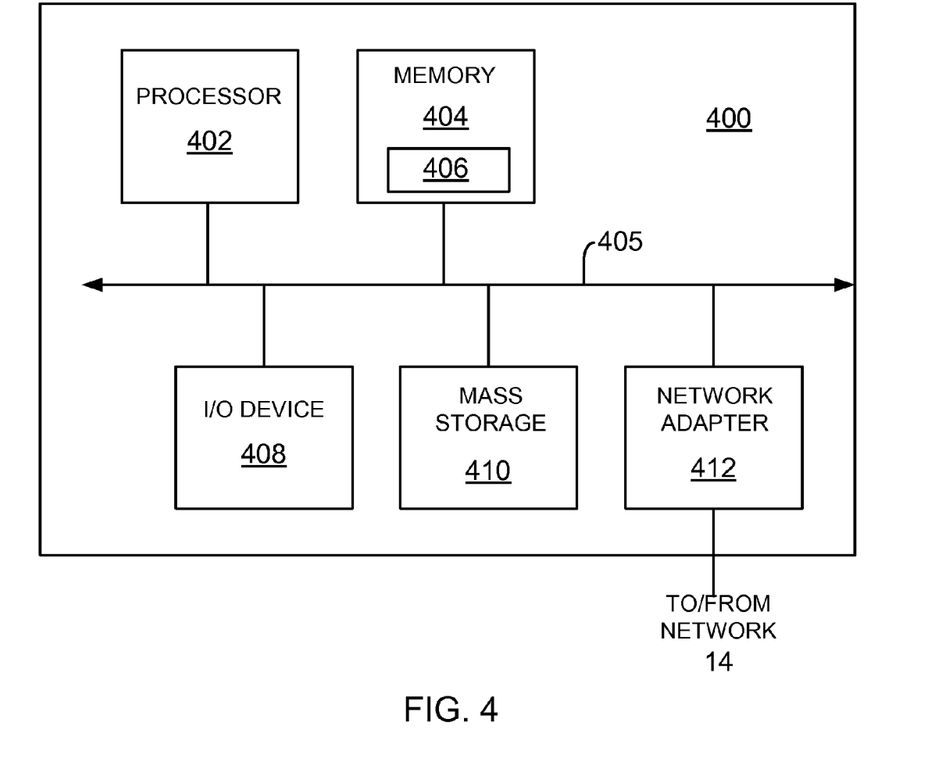
FIG. 4 shows a block diagram of a computing system for implementing the adaptive process of the present disclosure.

Processing System:

FIG. 4 is a high-level block diagram showing an example of the architecture of a processing system, at a high level, in which executable instructions for path selection module 56 described above, can be implemented. The processing system 400 can represent management console 18, clients 12, clients 114 and others. Note that certain standard and well-known components which are not germane to the present disclosure are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 402 are the central processing units (CPUs) of the processing system 400 and, thus, control its overall operation. In certain embodiments, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements the techniques introduced above (e.g., the path selection module 56 in FIG. 1B) may reside in and may be executed (by processors 402) from memory 404.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers 20) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer is a cloud platform and cloud infrastructure followed by a "server" layer that includes hardware and computer software designed for cloud specific services. Details regarding these layers are not germane to the inventive embodiments.

The storage systems described above can be a part of the server layer for providing storage services. Path selection 56 may be executed at any system that is coupled to the cloud. Data structure 62 may stored at a storage device coupled to the cloud. The process steps of FIGS. 1C and 1D may be executed using path selection module 56 and other programming instructions that may be adapted for the cloud computing environment.

Thus, a method and apparatus for managing errors in a system for accessing storage have been described. Note that references throughout this specification to "one embodiment" or "an embodiment" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the present disclosure, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for transmitting an input/output ("I/O") request between a storage system and a storage array, comprising:
    assigning a weight to a plurality of factors for determining a path quality of a plurality of paths between the storage system and the storage array;
    wherein a value of each weight is based on a likely contribution of each factor to a repetition of an error reported by a current path that is being used for transmitting the I/O request; and wherein the path quality provides a likelihood of reporting an error on an alternate path similar to the error reported on the current path;

assigning a threshold value for a path quality of each alternate path available to transmit the I/O request, when the current path reports an error;

wherein the threshold value is a minimum path quality for selecting a path for transmitting the I/O request without having to evaluate other available alternate paths;

determining if an alternate path is available for transmitting the I/O request, after an error is reported by the current path;

determining a path quality of the alternate path based on the weights assigned to the plurality of factors; and selecting the alternate path when the path quality of the alternate path is at least equal to the threshold value.

2. The method of claim 1, further comprising:
determining a path quality of other alternate paths available for transmitting the I/O request, if the path quality of the alternate path is less than the threshold value; and
selecting an alternate path from among the other alternate paths with a highest path quality.

3. The method of claim 2, wherein the path quality of the other alternate paths is stored in a data structure.

4. The method of claim 1, wherein a factor from among the plurality of factors is based on an error rate reported by the alternate path.

5. The method of claim 4, wherein a weight for the factor is higher if a lower error rate is reported by the alternate path.

6. The method of claim 1, wherein a factor from among the plurality of factors is based on whether a same target port group is used by the current path and the alternate path.

7. The method of claim 6, wherein a weight for the factor is higher if the same target port group is not used by the current path and the alternate path.

8. The method of claim 1, wherein a factor from among the plurality of factors is based on whether a same target port is used by the current path and the alternate path.

9. The method of claim 8, wherein a weight for the factor is higher if the same target port is not used by the current path and the alternate path.

10. The method of claim 1, wherein a factor from among the plurality of factors is based on whether a same switch is used by the current path and the alternate path.

11. The method of claim 10, wherein a weight for the factor is higher if the same switch is not used by the current path and the alternate path.

12. The method of claim 1, wherein a factor from among the plurality of factors is based on whether a same adapter is used by the current path and the alternate path.

13. The method of claim 12, wherein a weight for the factor is higher if the same adapter is not used by the current path and the alternate path.

14. A machine implemented method for transmitting an input/output ("I/O") request between a storage system and a storage array, comprising:
determining that an alternate path is available for transmitting the I/O request when an error is reported by a current path that is being used for transmitting the I/O request;
determining a path quality of the alternate path;
wherein the path quality is based on a weight assigned to a plurality of factors associated with a plurality of components between the storage system and the storage array and a value of each weight is based on a likely contribution of each factor to a repetition of the error reported by the current path;
selecting the alternate path when the path quality is at least equal to a threshold value; wherein the threshold value is a minimum path quality used for selecting the alternate path for transmitting the I/O request without having to evaluate other available alternate paths;
determining a path quality of other available alternate paths, when the path quality of the alternate path is less than the threshold value; and
selecting an alternate path from among the other alternate paths with a highest path quality.

15. The method of claim 14, wherein a factor from among the plurality of factors is based on an error rate reported by the alternate path.

16. The method of claim 15, wherein a weight for the factor is higher if a lower error rate is reported by the alternate path.

17. The method of claim 14, wherein a factor from among the plurality of factors is based on whether a same target port group is used by the current path and the alternate path.

18. The method of claim 17, wherein a weight for the factor is higher if the same target port group is not used by the current path and the alternate path.

19. The method of claim 14, wherein a factor from among the plurality of factors is based on whether a same target port is used by the current path and the alternate path.

20. The method of claim 19, wherein a weight for the factor is higher if the same target port is not used by the current path and the alternate path.

21. The method of claim 14, wherein a factor from among the plurality of factors is based on whether a same switch is used by the current path and the alternate path.

22. The method of claim 21, wherein a weight for the factor is higher if the same switch is not used by the current path and the alternate path.

23. The method of claim 14, wherein a factor from among the plurality of factors is based on whether a same adapter is used by the current path and the alternate path.

24. The method of claim 23, wherein a weight for the factor is higher if the same adapter is not used by the current path and the alternate path.

25. A system, comprising:
a storage system and a storage array using a current path having a plurality of components for processing an input/output ("I/O") request; and
a processor for the storage system executing instructions for determining that an alternate path is available for transmitting the I/O request, after an error is reported by the current path; and determining a path quality of the alternate path;
wherein the path quality is based on a weight assigned to a plurality of factors associated with the plurality of components between the storage system and the storage array and a value of each weight is based on a likely contribution of each factor to a repetition of the error reported by the current path; and
wherein the alternate path is selected when the path quality is at least equal to a threshold value, which is a minimum path quality for selecting the alternate path for transmitting the I/O request without having to evaluate other available paths.

26. The system of claim 25, wherein a path quality of other alternate paths available for transmitting the I/O request is determined, if the path quality of the alternate path is less than the threshold value; and an alternate path from among the other alternate paths with a highest path quality is selected.

27. The system of claim 25, wherein a factor from among the plurality of factors is based on an error rate reported by the alternate path.

28. The system of claim 27, wherein a weight for the factor is high if a lower rate is reported by the alternate path.

29. The system of claim 25, wherein a factor from among the plurality of factors is based on whether a same target port group is used by the current path and the alternate path.

30. The system of claim 29, wherein a weight for the factor is higher if the same target port group is not used by the current path and the alternate path.

31. The system of claim 25, wherein a factor from among the plurality of factors is based on whether a same target port is used by the current path and the alternate path.

32. The system of claim 31, wherein a weight for the factor is higher if the same target port is not used by the current path and the alternate path.

33. The system of claim 25, wherein a factor from among the plurality of factors is based on whether a same switch is used by the current path and the alternate path.

34. The system of claim 33, wherein a weight for the factor is higher if the same switch is not used by the current path and the alternate path.

35. The system of claim 25, wherein a factor from among the plurality of factors is based on whether a same adapter is used by the current path and the alternate path.

36. The system of claim 35, wherein a weight for the factor is higher if the same adapter is not used by the current path and the alternate path.

37. A machine implemented method, comprising:
generating a data structure comprising a weight assigned to a factor for determining a path quality of a path between a processor executable system and a storage space;
detecting an error associated with transmitting an input/output (I/O) request through a first path; and
accessing the data structure to determine an alternate path for transmitting the I/O request based on the weight assigned to the factor; wherein a value of the weight is based on a likely contribution of the factor to a repetition of the error reported by the first path and the alternate path is selected when the path quality of the alternate path is at least equal to a threshold value which is an indicator of an acceptable path quality for the alternate path; wherein the alternate path is selected if the path quality is equal to a threshold value, which is a minimum path quality for selecting an alternate path for transmitting the I/O request without having to evaluate other available paths.

38. The method of claim 37, wherein a path quality of the other available paths is determined, if the path quality of the alternate path is less than the threshold value; and an alternate path from among the other available paths with a highest path quality is selected.

* * * * *